(12) United States Patent  (10) Patent No.: US 8,087,925 B2
Katsuta et al.  (45) Date of Patent: Jan. 3, 2012

(54) DEVICE FOR FORMING HEADREST

(75) Inventors: Kazuo Katsuta, Tokyo (JP); Tsuyoshi Tabata, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 356 days.

(21) Appl. No.: 12/399,391

(22) Filed: Mar. 6, 2009

(65) Prior Publication Data
    US 2010/0227020 A1    Sep. 9, 2010

(51) Int. Cl.
    *B29C 45/00* (2006.01)
(52) U.S. Cl. ................................. 425/563; 425/562
(58) Field of Classification Search .............. 425/562, 425/563
    See application file for complete search history.

(56) References Cited

U.S. PATENT DOCUMENTS

| 3,241,191 A * | 3/1966 | Nouel ........................... 425/563 |
| 6,290,486 B1 * | 9/2001 | Koch ............................. 425/556 |
| 2008/0148687 A1 * | 6/2008 | Soudan ......................... 53/284.7 |

FOREIGN PATENT DOCUMENTS

| JP | 09-327828 A | 12/1997 |
| JP | 3650860 B2 | 5/2005 |

* cited by examiner

*Primary Examiner* — Yogendra Gupta
*Assistant Examiner* — Amjad Abraham
(74) *Attorney, Agent, or Firm* — Browdy and Neimark, PLLC

(57) ABSTRACT

A device for forming headrest in a foaming die, which includes a lid engagement mechanism operable to keep a lid member engaged in an injection nozzle placed in the foaming die, thereby preventing leakage of liquid foaming agent from the injection nozzle. Further, the device includes a lid disengagement mechanism operable to disengage the lid member from the injection nozzle and an injection gun movable vertically. The lid disengagement mechanism includes a pressure element provided at the injection gun. Upon downward movement of the injection gun, the pressure element acts on the lid member, so that the lid member is disengaged from the injection nozzle and the injection gun is then engaged with the injection nozzle, thereby allowing liquid foaming agent to be injected into a trim cover assembly placed in the foaming die.

3 Claims, 4 Drawing Sheets

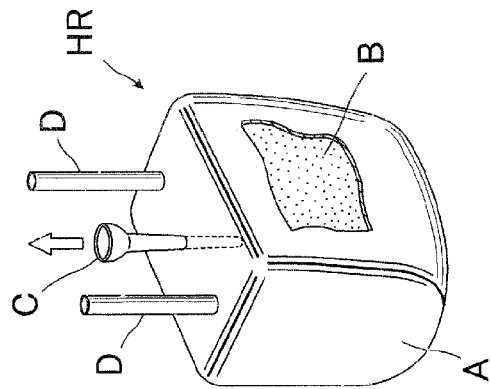
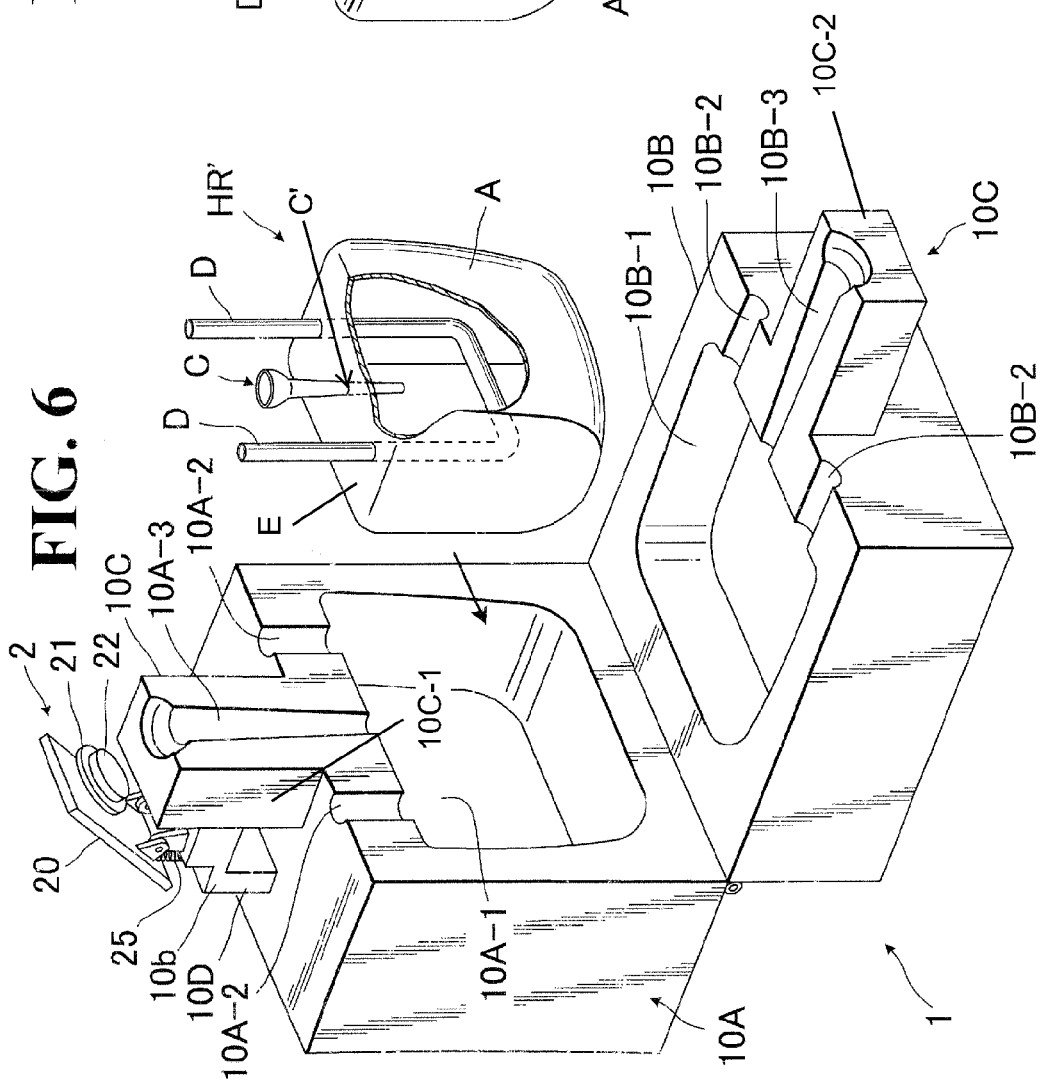
FIG. 6
FIG. 7

DEVICE FOR FORMING HEADREST

BACKGROUND OF THE INVENTION

1. Field of the Invention

The present invention relates to a device for forming a headrest. In particular, the invention is directed to a device for automatically forming a headrest, which is provided with a foaming die and designed to automatically inject a liquid foaming agent into a trim cover assembly placed in the foaming die and cure the liquid foaming agent into an increased mass of foam padding integrally filled in the trim cover assembly, thereby producing a resultant headrest.

2. Description of Prior Art

In general, a conventional foaming process for forming a headrest by means of a foaming die unit requires the steps of: providing a preformed three-dimensional trim cover assembly of a configuration conforming to a contour of headrest, with a headrest stay attached thereto; placing such trim cover assembly with the headrest stay in the foaming die; then inserting an injection nozzle into the trim cover assembly; injecting a liquid foaming agent via that injection nozzle into the inside of the trim cover assembly; and curing the liquid foaming agent into an increased mass of foam padding filled in the trim cover assembly together with the headrest stay in an integral manner.

The aforementioned foaming process has a problem that the increasing mass of foam padding or foamed material is forced into the injection nozzle during the foaming operation and eventually discharged from that injection nozzle to the outside of the die.

Hitherto, in order to prevent such undesired discharge of foamed material, the foaming die unit is provided with a movable lid for the hole of the injection nozzle closed, and such lid must be manually retained by a worker in a state pressed against the injection nozzle to keep closing the hole of injection nozzle, as for example disclosed from the Japanese Patent No. 3650860.

In other words, it has been required on the worker's side to keep pressing the lid against the hole of injection nozzle for a predetermined period of time until the liquid foaming agent is cured into a final mass of foam padding in the trim cover assembly.

But, in mass production of headrests, during the time for curing the liquid foaming agent, another foaming die containing a trim cover assembly and headrest stay therein is transferred to the worker for the above-described liquid foaming agent injection operation, and therefore, the worker must stop such another foaming die until the liquid foaming agent is cured in the first foaming die, while the worker has to be ready to insert an injection gun to the hole of the injection nozzle provided on that another foaming die. Thus, the conventional headrest production system of this kind takes much time at the steps where the worker keeps closing the hole of the injection nozzle and thereafter inserts an injection gun to an injection nozzle of the next foaming die.

SUMMARY OF THE INVENTION

In view of the above-stated drawbacks, it is a purpose of the present invention to provide a device for forming headrest which is operable to automatically close and open an opened end portion of injection nozzle and automatically inject a liquid foaming agent via the injection nozzle into a trim cover assembly placed in a foaming die and cure the liquid foaming agent therein, while automatically maintaining the opened end portion of injection nozzle in a closed state to prevent leakage of the liquid foaming agent therethrough.

In order to achieve such purpose, in accordance with the present invention, a device for forming a headrest is basically comprised of:

a foaming die element including:
  a cavity formed in the foaming die element, said cavity allowing a three-dimensional trim cover assembly to be placed therein, wherein the three-dimensional trim cover assembly is preformed in a shape substantially conforming to a resultant headrest; and
  a through-hole formed in the foaming die element so as to communicate said cavity with an outside of the foaming die element, the through-hole having outward opening defined in the outer side of the foaming die element and being adapted for allowing an injection nozzle to be placed therein, such that one opened end portion of the injection nozzle extends into an inside of the three-dimensional trim cover assembly placed in the cavity, while another opened end portion of the injection nozzle is disposed at the outward opening of the through-hole;

a lid engagement mechanism including:
  a plate member pivotally connected with the foaming die element, the plate member having one end portion and another end portion opposite to the afore-said one end portion;
  a lid member fixed on afore-said one end portion of plate member, the lid member being adapted to be closely engaged in the afore-said another opened end portion of the injection nozzle; and a biasing element for biasingly causing the afore-said one end portion of the plate member to rotate towards the outward opening of the through-hole to thereby engage and fit the lid member in the afore-said another opened end portion of the injection nozzle placed in the through-hole;

an injection molding unit having an injection mechanism and an injection gun, the injection molding unit being operable to supply a liquid foaming agent and discharge the liquid foaming agent outwardly from the injection gun via the injection mechanism, wherein said injection mechanism and said injection gun are movable vertically; and a lid disengagement mechanism including a pressure element arranged at the injection mechanism so as to be disposed near to the injection gun and extend vertically therefrom, wherein the pressure element is adapted to press afore-said another end portion of the plate member associated with the lid closing mechanism against a biasing force of the biasing element in order to disengage the lid member from the afore-said another opened end portion of the injection nozzle placed in the through-hole, wherein, the lid member is normally biased to engagement in the afore-said another opened end portion of the injection nozzle placed in the through-hole, thereby temporarily retaining the afore-said particular another opened end portion in closed and sealed state, and wherein, upon movement of the injection mechanism towards the foaming die element, the pressure element is simultaneously moved toward and press the afore-said another end portion of plate member to cause disengagement of the lid member from the afore-said another opened end portion of injection nozzle, thereby exposing that particular another opened end portion, and then, the injection gun is engaged in the thus-exposed another opened end portion of the injection nozzle to thereby allow the liquid foaming agent to be injected through the injection gun and injection nozzle into the inside of the three-dimensional trim cover assembly placed in the foaming die element.

As one aspect of the present invention, an injection gun cleaning mechanism may be provided in the above-described device, which comprises: an operative hollow body; a cleaning brush rotatably supported in the operative hollow body; and a drive means for causing the operative hollow body and the cleaning bush to move toward and away from the injection mechanism and also causing rotation of the cleaning brush, wherein, upon operation of the drive means, the operative hollow body is moved to the injection mechanism, so that the cleaning brush is brought to contact with an edge of the injection gun and rotated to clean off a residual portion of the liquid foaming agent attached to the edge.

As another aspect of the invention, the afore-said operative hollow body may include at least two different sloped wall regions defined in a side thereof facing toward the injection mechanism and injection gun, and the afore-said pressure element may comprise: a stationary pressure element fixed to the injection mechanism; and a movable pressure element pivotally connected with said stationary pressure element, said movable pressure element having at least one roller rotatably provided therewith.

Other various features of the present invention will become apparent from reading of the description, hereinafter, with reference to the accompanied drawings.

BRIEF DESCRIPTION OF THE DRAWINGS

FIG. 6 is a partly broken schematic perspective view showing a foaming die to be used in the device and a basic headrest unit to be placed in the foaming die; and FIG. 7 is a partly broken schematic perspective view of a resultant headrest produced by the device.

DETAILED DESCRIPTION OF PREFERRED EMBODIMENT OF THE INVENTION

Referring to FIGS. 1 to 6, there is illustrated a preferred embodiment of device for forming a headrest, as generally designated by (HD), in accordance with the present invention.

The device (HD) is designed to automatically effect required operations for foaming operations in order to form a resultant headrest (HR) shown in FIG. 7. Briefly stated, this device (HD) is operable to inject a liquid foaming agent (B') into the inside of three-dimensional trim cover assembly (A) preformed in a shape substantially conforming to the headrest, the trim cover assembly (A) being placed in a foaming die unit provided as one of elements of the device (HD) (the foaming die unit is shown by each of designations 1(A), 1(B) and 1(C) for example), and thereafter cure the liquid foaming agent (B') into an increased mass of foam padding (B) in that trim cover assembly (A).

At first, as shown in FIG. 6, a basic headrest unit (HR') is provided, which is to undergo a foaming processes by operation of the device (HD) into a resultant headrest (HR) as will be described later. The basic headrest unit (HR') is preformed by providing a pair of headrest stays (D) and (D) in the afore-said trim cover assembly (A) so as to project outwardly through the respective holes formed in a bottom wall (E) of the trim cover assembly (A) and also by inserting and attaching a lower small-diameter end portion of an injection nozzle (C) in a hole (C') formed in substantially a center of the bottom wall of the trim cover assembly (A). It is noted that the bottom wall (E) of trim cover assembly (A) is to face downwardly when a resultant headrest is mounted on a seat, thus constituting a bottom side or bottom wall of the headrest.

Figure 2:
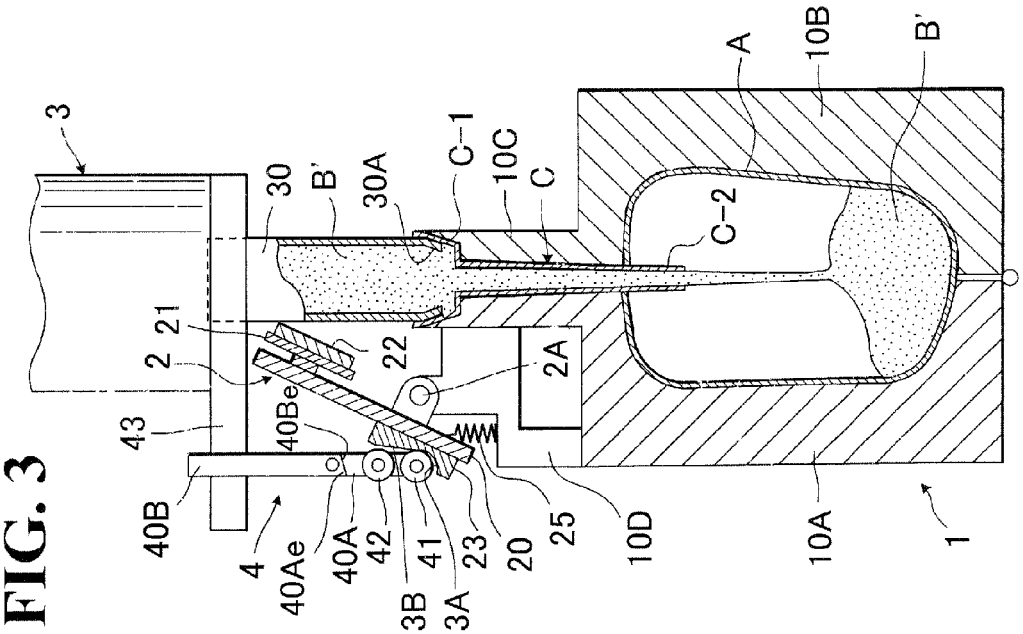
FIG. 2 is a partly broken and partly sectioned plan view showing a principal part of the device for forming headrest.

Referring to FIG. 2, it is seen that the injection nozzle (C) is formed with a downwardly tapered lower small-diameter portion (C-2) and an upper large-diameter connecting portion (C-1) which is larger in diameter than that lower portion (C-2). The lower small-diameter portion (C-2) is shown as extending through and secured in the bottom wall (E) of trim cover assembly (A), while the upper large-diameter connecting portion (C-1) is shown as projecting upwardly from the latter.

The thus-preformed basic headrest unit (HR') is placed in a foaming die (1) comprising a first die element (10A) and a second die element (10B), wherein the first and second die elements (10A) and (10B) are hingedly connected together and may be moved away from each other, so that the foaming die (1) is set in an opened state as seen in FIG. 6.

The first die element (10A) has, defined therein, an operative die cavity (10A-1) and a pair of concave portions (10A-2) and (10A-2) extending through the die element (1A), wherein each of the concave portions (10A-2) is so configured to receive one half of the headrest stay (D). Designation (10C) generally denotes an injection nozzle support portion integrally formed with the foaming die (1), which is adapted to receive and support an injection nozzle (C) to be described later. Designation (10C-1) denotes one half of that injection nozzle support portion (10C) (hereinafter, "nozzle support half (10C-1)"), which is defined integrally with the first die element (10A). As shown, formed in that nozzle support half (10C-1) is a recessed portion (10A-3) which extends therethrough in such a manner as to communicate the operative die cavity (10A-1) with the outside of the nozzle support half (10C-1), the recessed portion (10A-3) being so configured to receive an entire one half of an injection nozzle (C) therein. Thus, the recessed portion (10A-3) has an opening defined in the top of the nozzle support half (10C-1).

Likewise, the second die element (10B) has, defined therein, an operative die cavity (10B-1) and a pair of concave portions (10B-2) and (10B-2) each being so configured to receive the other half of the headrest stay (D). Designation (10C-2) denotes the other half of the injection nozzle support portion (10C) (hereinafter, "nozzle support half (10C-2)"), which is defined integrally with the second die element (10A). As shown, formed in that nozzle support half (10C-2) is a recessed portion (10B-3) so configured to receive the entire other half of the injection nozzle (C) therein. The recessed portion (10B-3) extends through the nozzle support half (10C-2) in such a manner as to communicate the operative die cavity (10B-1) with the outside of the nozzle support half (10C-2), thus having an opening defined in the top of that particular nozzle support half.

It is therefore to be seen that, when the first and second die elements (10A) and (10B) are mated with other to close the foaming die (1), both two operative die cavities (10A-1) and (10B-1) are also mated together to define a space for accommodating the entirety of trim cover assembly (A) therein for a foaming operation purpose to be set forth later, and at the same time, both two recessed portions (10A-3) and (10B-3) are mated together to define a through-bore for receiving and supporting an entirety of the injection nozzle (C) therein, while defining an opening in the top of a resultant nozzle support portion (10C).

Now, a specific description will be made of the device (HD) for forming headrest in conjunction with the above-described foaming die (1).

Figure 1:
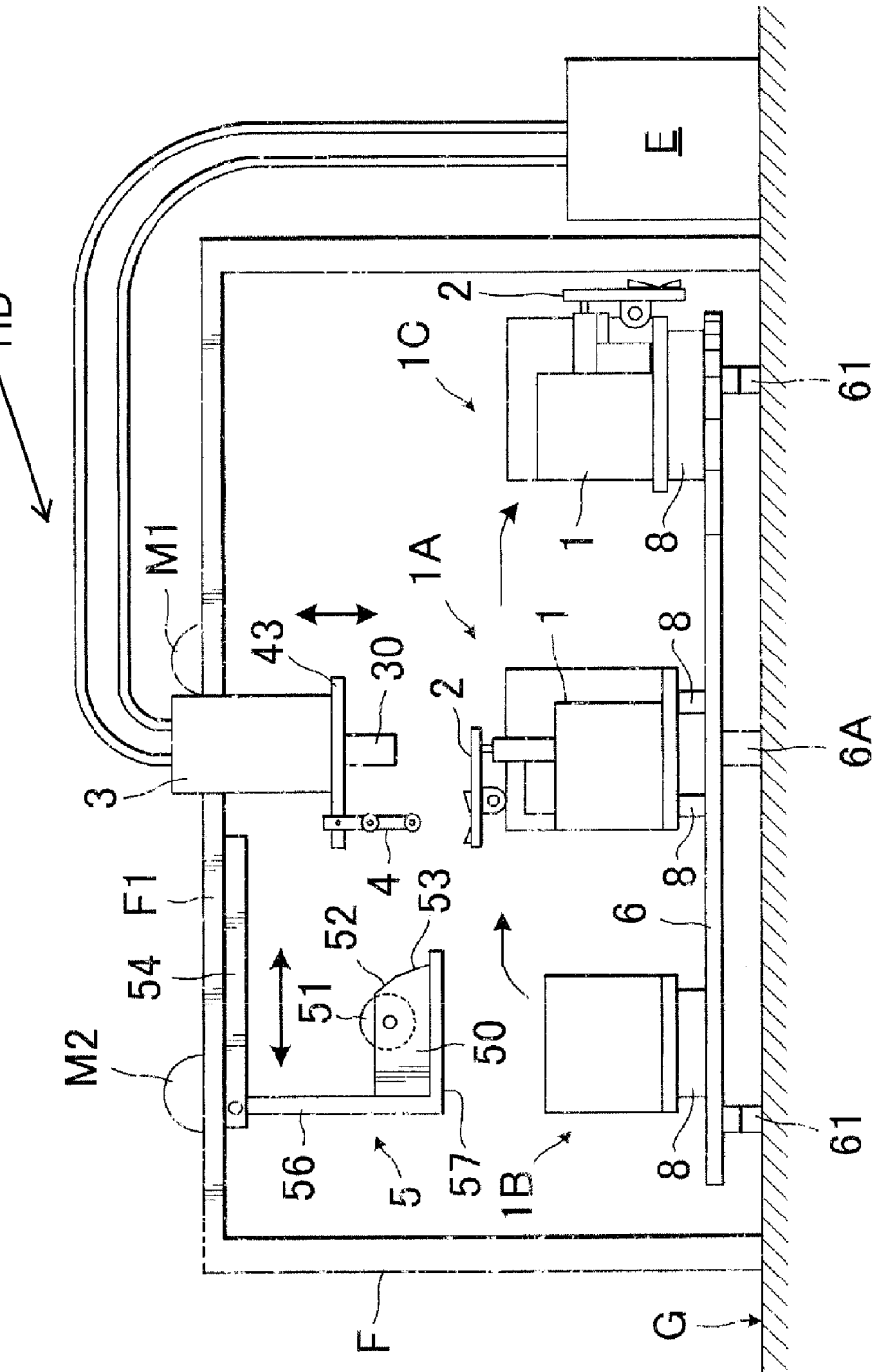
FIG. 1 is a diagram illustrating a whole of device for forming headrest in accordance with the present invention.

As understandable from FIG. 1, the device (HD) is basically comprised of:

(a) a lid engagement mechanism (2) provided on the foaming die (1);

(b) a support frame (F) fixedly mounted on a floor (G);

(c) an injection molding unit (E) having an injection mechanism (3), wherein the injection mechanism (3) is supported on an upper frame member (F1) of the support frame (F) in a vertically movable manner;

(d) a lid disengagement mechanism (4) provided to the injection molding unit (3) in such a manner as to be movable and suspendent from the latter;

(e) an injection gun cleaning unit (5) provided on the upper frame member (F1) in a horizontally movable manner;

(f) a turn table (6) on which are securely placed a predetermined number of foaming die units each including the foaming die (1), as designated by (1A), (1B) and (1C) for example, the turn table (6) being rotatably provided on the floor (G) under those injection mechanism (3) and injection gun cleaning unit (5).

The lid engagement mechanism (2) is provided on the foaming die (1) and operable for engaging a lid member (at 21 and 22) in an opening of the upper connecting portion (C-1) of injection nozzle (C) placed in the nozzle support portion (10C) and temporarily keeping that injection nozzle portion (C-1) in a closed or sealed state to prevent leakage of liquid foaming agent therethrough, as will be elaborated. This lid engagement mechanism (2) is composed of: a plate member (20) pivotally connected with a base member (10D); a pair of first and second circular lid members (21) and (22) which are fixed to the plate member (20); and a spring (25). The base member (10D) is integrally connected with the injection nozzle support portion (10C) as well as the first die element (19A).

Specifically, as seen FIGS. 2 and 6, the plate member (20) is pivotally connected at the base end portion thereof by a pin (2A) to the base member (10D) integrally formed with the first die element (10A), thereby allowing the free end portion thereof to rotate vertically about that pin (2A), and the first and second circular lid members (21) and (22) are fixed on the bottom surface of the free end portion of the plate member (20). In this regard, the circular first and second lid members (21) (22) are formed integrally together as shown, thus forming one lid element workable for engaging and closing the opening of the upper connecting portion (C-1) of injection nozzle (C) as will be described later. It is to be seen that the first circular lid member (21), larger in diameter than the second lid member (22), is adapted for closely contacting the entire circular distal end of the upper connecting portion (C-1) of injection nozzle (C), whereas the second circular lid member (22) is adapted to be engaged and fitted in the circular opening of that connecting portion (C-1).

The spring (25) is depicted to be connected between the afore-said base member (10D) and the bottom surface of the base end portion of the afore-said plate member (20). Under upwardly resilient force of the spring (25), the free end portion of the plate member (20) is biasingly caused to rotate downwardly about the pin (2A), so that the first and second lid members (21) (22) are normally biased to fit in engagement in the opening of the upper large-diameter connecting portion (C-1) of injection nozzle (C) as will be stated later.

The turn table (6) is operatively connected at the central shaft (6A) thereof with a motor and controlled by control elements, though not shown, with such an arrangement that the turn table (6) is rotated intermittently in order that one of the foaming die units (at 1A, 1B and 1C for example) is transferred to and stopped at a predetermined position right below the injection gun (30) associated with the injection molding unit (E) for foaming operation to be described later.

The injection molding unit (E) itself is a conventional injection molding mechanism used for injecting a liquid synthetic resin or liquid foaming agent through injection gun into a molding or die. In the illustrative embodiment, the injection molding unit (E) includes: an injection mechanism (3) supported by the upper frame member (F1) in a vertically movable manner; and an injection gun (30) provided in the injection mechanism (3) so as to be movable vertically to and from the latter in a telescopic manner. Upon operation of the injection molding unit (E), a liquid foaming agent (see the designation B' in FIG. 3) stored therein is transferred to the injection mechanism (3) and discharged from the injection gun (30) to the outside. While not shown, the injection molding unit (E) includes a mechanism for causing vertical movement of the injection mechanism (3) and also causing vertical movement of the injection gun (30), wherein such mechanism (not shown) is operatively connected with a motor (M1). Hence, operation of the motor (M1) causes each of the injection mechanism (3) and injection gun (30) to move vertically in a direction toward and away from one of the afore-said foaming die units which is just positioned right below the injection gun (30).

The lid engagement mechanism (4) basically comprises: an upper stationary pressure plate element (40B) fixed to the foregoing injection mechanism (3); and a lower movable pressure plate element (40A) pivotally connected with that upper stationary pressure plate portion (40B); and an engagement piece (23) fixed on the upper surface of base end portion of the aforementioned plate member (20) associated with the lid disengagement mechanism (2). It is to be understood that the upper and lower pressure plate elements (40B) and (40A) constitute one vertically extending pressure plate element operable to provide a downward pressure to the plate member (20) of lid closing mechanism (2), thereby causing that plate member (20) to rotate so as to disengage the lid members (21 and 22) from the opening of upper connecting portion (C-1) of injection nozzle (C) as will be described later.

With regard to such lid disengagement mechanism (4), at first, a horizontal support frame (43) is fixed to the injection mechanism (3) so as to project outwardly and horizontally therefrom, as shown, and the above-defined one vertically suspending pressure rod element is fixed to that horizontal support frame (43). Specifically, the upper stationary pressure plate element (40B) is fixed to the outwardly projected horizontal support frame (43), whereas on the other hand, the lower movable pressure plate element (40A) is provided with a pair of first and second rollers (41) and (42) and pivotally connected with the upper stationary pressure plate element (40B) by means of a pin (40C). The upper stationary and lower movable plate elements (40C) and (40A) are formed with an upper sloped stopper edge (40Be) and a lower sloped stopper edge (40Ae), respectively, wherein the inclination angle of the former (40Be) is equal to that of the latter (40Ae), such that, when such two stopper edges (40Ae) (40Be) are in contact with each other, both of the upper stationary and lower movable pressure plate elements (40B) (40A) extend in the same vertical direction and in a continuous manner as if they are formed as one unitary pressure plate element suspended from and perpendicular with the horizontal support frame (43), as shown in FIG. 2. Under such perpendicularly extending state, by the reason of the above-discussed full contact between the two sloped edges (40Ae) (40Be), the lower movable pressure plate element (40A) is completely prevented from being rotated and inclined about the pin relative to the vertically extending upper stationary pressure plate element (40B). This is only effective when a vertical force or pressure is directly and coaxially applied from the upper stationary pressure element (40B) to that lower pressure plate element (40A). On the other hand, when a generally horizontal or lateral force is applied to the lower movable pressure element (40A) in a direction toward the body of the injection mechanism (3), the lower movable pressure plate element (40A) is rotated and inclined relative to the upper stationary pressure plate element (40B) in a direction toward the body of the fore-stated injection mechanism (3), as understandable from FIG. 5 for instance.

Figure 5:
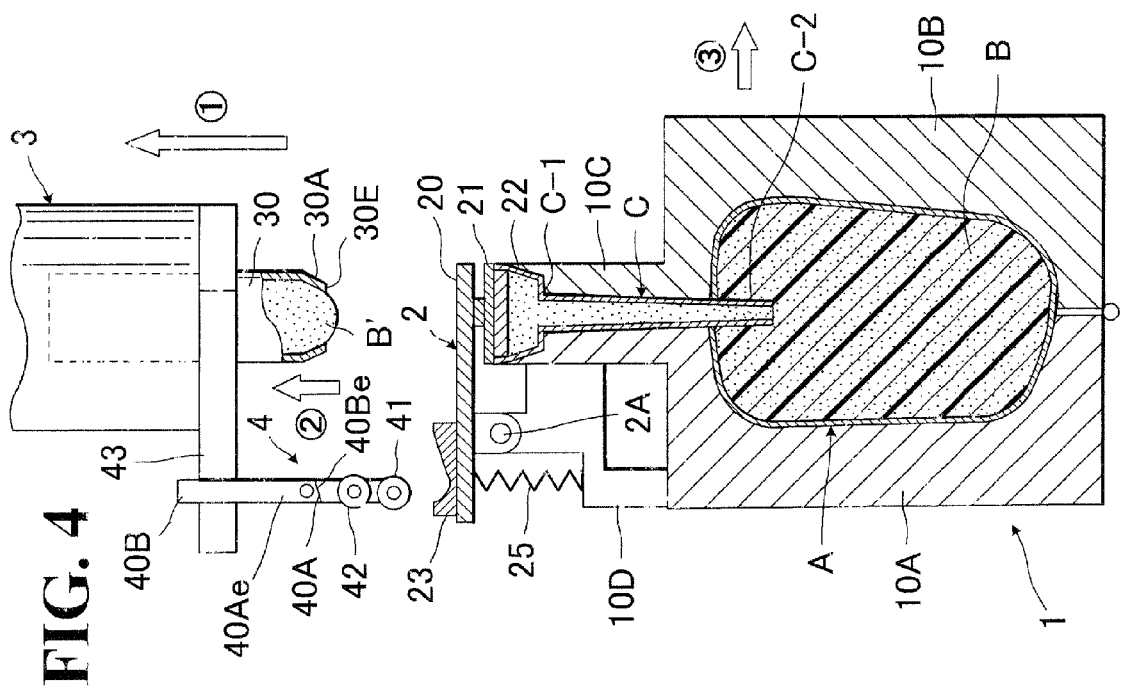
FIG. 5 is a partly broken and partly sectioned plan view showing a principal part of an injection gun cleaning mechanism.

The injection gun cleaning unit (5) comprises an operative hollow body (50) and a rotating brush (51) rotatably supported in the operative hollow body (50). Specifically, the operative hollow body (50) is so formed to have such sectional configuration as shown in FIG. 5, which includes an acutely sloped wall region (52), a gently sloped wall region (53), an upper horizontal planar wall region (54) and an opening (55) formed in that upper horizontal planar wall region (54). Rotatably supported in so formed hollow body (50) is the rotating brush (51) which is of substantially columnar shape, such that a localized upper part of the rotating brush (51) is exposed from the opening (55). While not shown, the rotating brush (51) is operatively connected with a motor through appropriate mechanisms and control elements for a cleaning purpose to be stated later. The operative hollow body (50) is fixedly mounted on a horizontal arm portion (57) of a support arm (56) is movably connected with the upper frame member (F1) of the frame (F). The support arm (56) that is moved by operation of a motor (M2) in a horizontal direction towards and away from the foregoing injection mechanism (3) through mechanisms and control elements not shown in the drawings, thereby causing translation of the injection gun cleaning unit (5) under the injection mechanism (3) as indicated by the horizontal arrow in FIG. 1.

A description will be made of operation of the above-described automated headrest production device (HD).

First of all, as stated previously, the basic headrest unit (HR') is placed in a cavity (10A-1 and 10B-1) of mutually mated die elements (10A and 10B), such that the two headrest stays (D) are retained in the respective two through-holes each being defined by the corresponding mated two concave portions (10A-2) (10B-2), while the injection nozzle (C) is retained in a through-bore defined by mated two concave portions (10A-3) (10B-3). At this point, as seen in FIG. 2, the lid engagement mechanism (2) is in the state of closing the injection nozzle (C), because, under the biasing force of the spring (25), the first lid member (21) thereof is held in close contact upon the circular upper edge of the injection nozzle upper connecting portion (C-1), while the second lid member (22) thereof is inserted in the inner opening of that particular injection nozzle upper connecting portion (C-1). In other words, as the plate member (20) is biasingly caused by the spring (25) to rotate downwardly toward the top of the nozzle support portion (10C), the opening of the injection nozzle upper connecting portion (C-1) is kept closed by the first and second lid members (21) (22). In that way, one foaming die unit (hereinafter, designated by 1(A) for example) with the thus-closed foaming die (1) is provided, by attaching thereto a required frame (not shown) for releasable connection with the turn table (6).

Then, such foaming die unit (1A) is securely mounted on a predetermined position of the turn table (6).

When the foaming die unit (1A) is transferred and stopped by the turn table (6) at an injection section where the injection mechanism (3) is disposed, the injection nozzle support portion (10C) of foaming die unit (1A) is positioned right below the injection gun (30), and the motor (M1) is automatically operated to cause downward movement of the injection mechanism (3) toward the foaming die unit (1A), with concurrent downward movement of both upper stationary and lower movable pressure plate elements (40B) (40A) of lid disengagement mechanism (4) toward the engagement piece (23) fixed on the plate member (20) of lid engagement mechanism (2), as indicated by the arrow in FIG. 2. Then, as readily understandable from FIG. 3, the first roller (41) of the lower movable pressure plate element (40A) are first contacted with and received in the recessed area (23A) of the engagement piece (23), and with further downward movement of both of those two pressure plate elements (40B) (40A), the plate member (20) of lid engagement mechanism (2) is rotated anticlockwise or upwardly about the pin (2A) against the biasing force of the spring (25). At this point, it is to be noted that (i) the lower sloped stopper edge (40Ae) of the upper stationary pressure plate element (40A) is in contact with the upper sloped stopper edge (40Be) of the lower movable pressure plate element (40B), thereby retaining the lower movable pressure plate element (40B) in its vertically extending state coaxially continuous with the upper stationary pressure plate element (40B) and thus prevented from rotating relative to the latter, (ii) such vertically extending state of both those two plate elements (40A) (40B) is maintained because of only a downward straight force being applied thereto from the engagement piece (23) of the plate member (20), and (iii) the first roller (41) of the lower movable pressure plate element (40B), engaged in the recessed portion (23A) of that engagement piece (23), is actually rotated to thereby prevent application of lateral force to that particular pressure plate element (40B). This arrangement insures that the lower movable pressure plate element (40B) is maintained in a vertically extending state, without being rotated or inclined relative to the upper stationary pressure plate element (40A), and the plate member (20) is smoothly rotated anticlockwise about the pin (2A) by both two pressure plate elements (40A) (40B) being moved downwardly with the concurrent downward movement of the injection mechanism (3).

Figure 3:
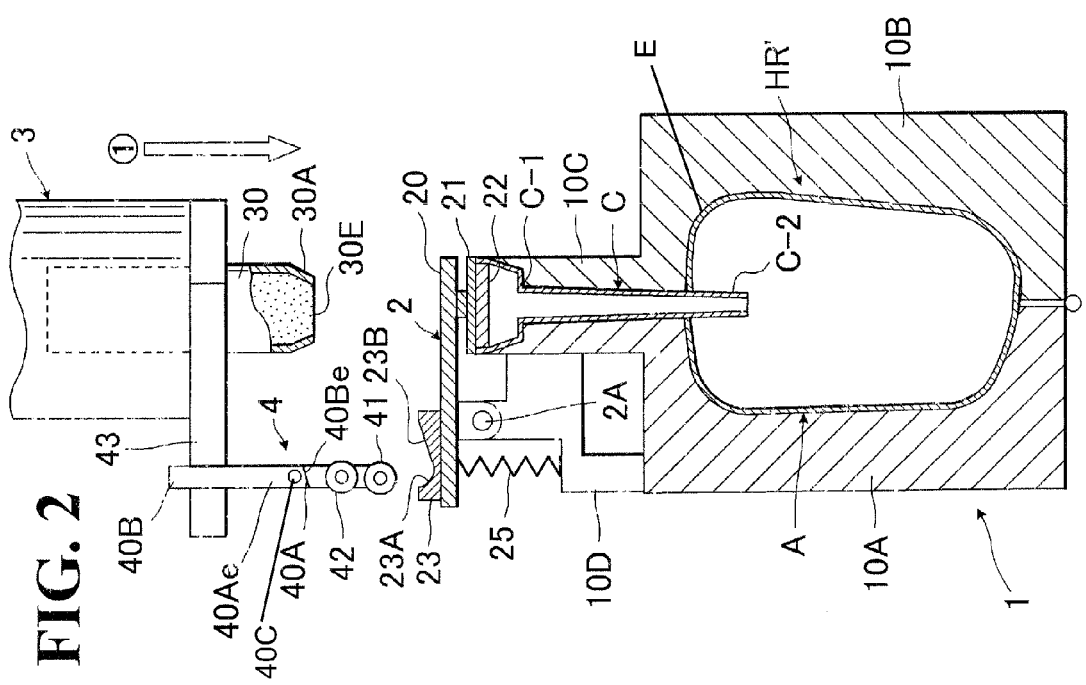
FIG. 3 is a partly broken and partly sectioned plan view for explanatorily showing the state where a lid disengagement mechanism is operated to open an injection nozzle and a liquid foaming agent is injected via such injection nozzle into a trim cover assembly.

As a result thereof, the first and second lid members (21) (22) are disengaged from the upper connecting portion (C-1) of injection nozzle (C), and the injection mechanism (3) is stopped at a predetermined position, at which time, the plate member (2) as well as those two lid members (21) (22) are temporarily retained at an inoperative position, as shown in FIG. 3, which does not interfere with the injection gun (30).

Then, the injection gun (30), which contains a liquid foaming agent (B') therein, is automatically moved downwardly from the body of injection mechanism (3) toward the injection nozzle support portion (19C), so that the distal end portion (30A) thereof is fit engaged in the upper connecting portion (C-1) of injection nozzle (C) retained in that injection nozzle support portion (10C). Responsive thereto, the injection molding unit (E) is operated to discharge the liquid foaming agent (B') from the injection gun (30), so that a predetermined volume of the liquid foaming agent (B') is injected through the injection nozzle (C) into the trim cover assembly (A) placed in the forming die (1), as shown in FIG. 3.

Figure 4:
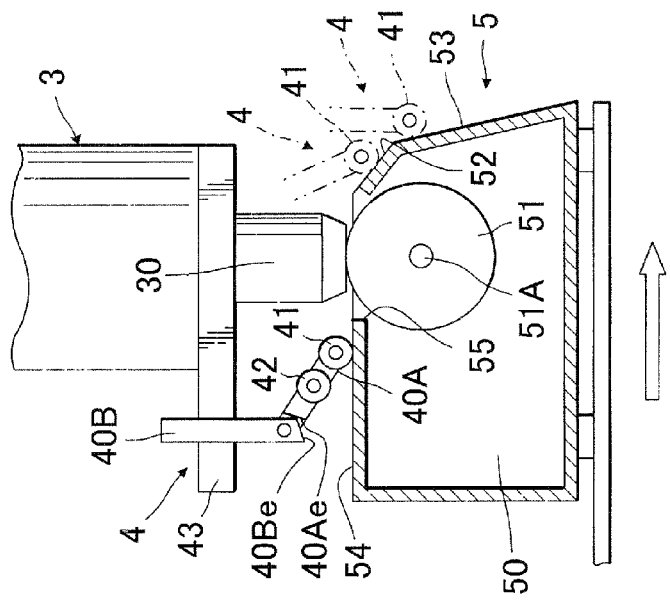
FIG. 4 is a partly broken and partly sectioned plan view for explanatorily showing the state where a lid engagement mechanism is operated to close the injection nozzle, while injection mechanism and injection gun are moved upwardly.

Thereafter, referring to FIG. 4, as indicated by the arrow ①, the injection gun (30) is first moved upwardly, disengaged from the upper connecting portion (C-1) of injection nozzle (1) and withdrawn into the body of the injection mechanism (3), whereupon that upper connecting portion (C-1) of injection nozzle (1) is opened. Shortly thereafter, the injection mechanism (3) is moved upwardly as indicated by the arrow ②. With such sequential upward movement of the injection gun (30) and injection mechanism (3), both two pressure plate elements (40A) and (40B) are simultaneously raised, which in turn allows the plate member (20) to simultaneously rotate clockwise about the pin (2A) under the biasing force of the spring (25), whereby the first and second lid members (21) and (22) are automatically displaced downwardly towards the opened upper connecting portion (C-1) of injection nozzle (1), without interference with the injection gun (30). As a result thereof, it is seen from FIG. 4 that the injection nozzle upper connecting portion (C-1) is completely closed and further retained in a sealed state against leakage of the liquid foaming agent (B') therethrough, because, under the biasing force of spring (25), the first lid member (21) is retained in a close contact upon the entire peripheral edge of the injection nozzle upper connecting portion (C-1), while at the same time, the second lid member (22) is retained in a close contact with the circumferential inner surface of that particular portion (C-1).

Under such sealed state, the liquid foaming agent (B') is cured into an increased mass of a foaming padding (B) filled in the trim cover assembly (A) as seen in FIG. 4, without being leaked outwardly through the injection nozzle (C). It is also to be appreciated that, during the foaming operation, the injection nozzle (C) is maintained in a closed state by the biasing force of the spring (25) to insure such prevention of leakage of liquid foaming agent (B'), thereby eliminating the necessity for a worker to manually keep on closing the injection nozzle (C) during the foaming operation.

After the completion of the foregoing foaming operations, it is to be noted that, as seen in FIG. 5, a residual portion of the liquid foaming agent (B') within the injection gun (30) remains protrudent from the distal end (30E) of that injection gun (30), and it is necessary to clean off such residual protrudent portion of liquid foaming agent (B').

In accordance with the present invention, at this stage, the turn table (6) is rotated to displace the foaming die unit (1A) away from the current position where the injection mechanism (3) exists, after which, the motor (M2) is operated to cause translation of the support frame member (56) along the guide member (54) towards the injection mechanism (3), so that the injection gun cleaning unit (5) or the operative body (52) of the injection gun cleaning unit (5) is moved to a vertically extending pair of the upper stationary and lower movable pressure plate elements (40A) (40B).

Reference is now made to FIG. 5. With further movement of the operative hollow body (50) of injection cleaning unit (5) as indicated by the arrow, it is to be seen from the one-dot chain lines in FIG. 5 that the first roller (41) of the lower movable pressure plate element (40A) is contacted with and rotates on and along the acutely sloped wall region (53) of the operative body (50), which causes simultaneous anticlockwise rotation of the lower movable pressure plate element (40A) relative to the upper stationary pressure plate element (40B). Also, with yet further movement of the operative hollow body (50), it is to be seen from the one-dot chain lines and solid lines in the FIG. 5 that the first roller (41) rolls on and along the acutely sloped wall region (52) of operative body (5), rides over both opening (55) and the exposed part of the cleaning brush (51), and finally rides on and along the upper planar wall region (54) of the operative body (5). In that way, the operative hollow body (50) is smoothly moved, without being intercepted by the pressure plate element (40A), to a predetermined point where the cleaning brush (51) is located right below the injection gun (30).

When the operative hollow body (50) reaches that predetermined point, with the cleaning brush (51) being located right below the injection gun (30), the motor (M2) is operated to cause downward movement of the injection gun (30) towards the exposed part of the cleaning brush (51). Upon the protrudent residual portion of the liquid foaming agent (B') as well as the injection gun lower edge (30E) being in contact with the exposed part of cleaning brush (51), the injection gun (30) is stopped and the cleaning brush (51) is rotated to clean off that residual portion of liquid foaming agent (B') attached to the lower edge (30E) of injection gun (30) and to discharge the same into the inside of the operative hollow body (5).

After the residual portion of liquid foaming agent (B') is cleaned off from the lower edge (30E) of injection gun (30), the motor (M1) is operated reversely to cause the injection gun (30) to move upwardly from the cleaning brush (51), after which, the motor (M2) is operated reversely to cause the operative hollow body (5) to move away from the injection gun (30) and return the same to the home position. At this point, of course, the inclined lower movable pressure plate element (40A) is rotated back to the normal vertically extending position where it extends vertically in alignment with the upper stationary pressure plate element (40B) as shown in FIG. 2, with the roller (41) running in reverse direction on and along the outer contour portions (at 54, 55, 52 and 53) of the operative body (50).

Finally, the foaming die unit (1A) is taken out from the turn table (6), and the first and second foaming die elements (10A) (10B) of the foaming die (1) are opened, so that a resultant headrest (HR) is taken out therefrom. FIG. 7 shows the resultant headrest (HR) produced by the device (DH).

Likewise as described above, each of another foaming die units (at 1(B) for example) will undergo the same steps of operations effected so far by the device (DH) to produce a plurality of resultant headrests (HR) in an automated manner.

While having described the present invention thus far, it should be understood that the invention is not limited to the illustrated embodiment, but any other modification, replacement and addition may be applied thereto, without departing from the scopes of the appended claims. For example, the present invention may be used for forming armrests.

What is claimed is:

1. A device for forming a headrest, comprising:
at least one foaming die element including:
a cavity formed in the foaming die element, said cavity allowing a three-dimensional trim cover assembly to be placed therein, wherein said three-dimensional trim cover assembly is preformed in a shape substantially conforming to a resultant headrest; and
a through-hole formed in the foaming die element so as to communicate said cavity with an outside of said foaming die element, said through-hole having outward opening defined in said outer side of said foaming die element and being configured to allow an injection nozzle to be placed therein, such that one opened end portion of said injection nozzle extends into an inside of said three-dimensional trim cover assembly placed in said cavity, while another opened end portion of the injection nozzle is disposed at said outward opening of said through-hole;

a lid engagement mechanism provided on said at least one forming die element, said lid engagement mechanism including:
- a plate member pivotally connected with said at least one foaming die element, said plate member having one end portion and another end portion opposite to said one end portion;
- a lid member fixed on said one end portion of said plate member, said lid member being adapted to be engaged in and closely fitted in said another opened end portion of the injection nozzle; and
- a biasing element provided between said plate member and said at least one foaming die element, said biasing element being configured to biasingly cause said one end portion of said plate member to rotate towards said outward opening of said through-hole, so that said lid member is normally kept to be engaged and fit in said another opened end portion of said injection nozzle placed in said through-hole, thereby temporarily retaining said another opened end portion in closed and sealed state;

an injection molding unit having an injection mechanism and an injection gun disposed below said injection mechanism, said injection molding unit being operable to cause vertical movement of said injection mechanism, which in turn causes simultaneous vertical movement of said injection gun, and being also operable to supply a liquid foaming agent and discharge the liquid foaming agent outwardly from said injection gun via said injection mechanism;

a transfer mechanism, which allows said at least one foaming die element to be securely placed thereon, said transfer mechanism being operable to transfer said at least one foaming die element to a predetermined point under said injection mechanism and said injection gun; and a lid disengagement mechanism provided on said injection mechanism, including a pressure element that extends vertically therefrom and is disposed near to said injection gun, said pressure element being configured to press said another end portion of said plate member associated with said lid engagement mechanism against a biasing force of said biasing element in order to disengage said lid member from said another opened end portion of said injection nozzle placed in said through-hole, wherein, when said at least one foaming die element is transferred to and stopped at said predetermined point by operation of said transfer mechanism, said injection molding unit is operated to move both and downwardly toward said at least one foaming die element, said pressure element being simultaneously moved toward and pressing said another end portion of said plate member to cause disengagement of said lid member from said another opened end portion of said injection nozzle, thereby opening and exposing said particular another opened end portion, and then, said injection gun is engaged in the thus-exposed another opened end portion of the injection nozzle to thereby allow said liquid foaming agent to be injected through said injection gun and said injection nozzle into the inside of said there-dimensional trim cover assembly placed in said at least one foaming die element, and wherein after the liquid foaming agent has been injected in the three-dimensional trim cover assembly, said injection molding unit is reversely operated to withdraw said injection mechanism and said injection gun upwardly from said at least one foaming die element, with said pressure element being moved away from said another end portion of said plate member, so that said lid member is biasingly caused by said biasing element to engage and fit in said another opened portion of said injection nozzle.

2. A device for forming a headrest, comprising:

at least one foaming die element including:
- a cavity formed in the foaming die element, said cavity allowing a three-dimensional trim cover assembly to be placed therein, wherein said three-dimensional trim cover assembly is preformed in a shape substantially conforming to a resultant headrest; and
- a through-hole formed in the foaming die element so as to communicate said cavity with an outside of said foaming die element, said through-hole having outward opening defined in said outer side of said foaming die element and being configured to allow an injection nozzle to be placed therein, such that one opened end portion of said injection nozzle extends into an inside of said three-dimensional trim cover assembly placed in said cavity, while another opened end portion of the injection nozzle is disposed at said outward opening of said through-hole;

a lid engagement mechanism provided on said at least one forming die element, said lid engagement mechanism including:
- a plate member pivotally connected with said at least one foaming die element, said plate member having one end portion and another end portion opposite to said one end portion;
- a lid member fixed on said one end portion of said plate member, said lid member being adapted to be engaged in and closely fitted in said another opened end portion of the injection nozzle; and
- a biasing element provided between said plate member and said at least one foaming die element, said biasing element being configured to biasingly cause said one end portion of said plate member to rotate towards said outward opening of said through-hole, so that said lid member is normally kept to be engaged and fit in said another opened end portion of said injection nozzle placed in said through-hole, thereby temporarily retaining said another opened end portion in closed and sealed state;

an injection molding unit having an injection mechanism and an injection gun disposed below said injection mechanism, said injection molding unit being operable to cause vertical movement of said injection mechanism, which in turn causes simultaneous vertical movement of said injection gun, and being also operable to supply a liquid foaming agent and discharge the liquid foaming agent outwardly from said injection gun via said injection mechanism;

a transfer mechanism, which allows said at least one foaming die element to be securely placed thereon, said transfer mechanism being operable to transfer said at least one foaming die element to a predetermined point under said injection mechanism and said injection gun;

a lid disengagement mechanism provided on said injection mechanism, including a pressure element that extends vertically therefrom and is disposed near to said injection gun, said pressure element being configured to press said another end portion of said plate member associated with said lid engagement mechanism against a biasing force of said biasing element in order to disengage said lid member from said another opened end portion of said injection nozzle placed in said through-hole; and an injection gun cleaning mechanism comprising:
  an operative hollow body;
  a cleaning brush rotatably supported in said operative hollow body; and
  a drive means for causing said operative hollow body and said cleaning bush to move toward and away from said injection mechanism and also causing rotation of said cleaning brush,
  wherein, upon operation of said drive means, said operative hollow body is moved to said injection mechanism, so that said cleaning brush is brought to contact with an edge of said injection gun and rotated to clean off a residual portion of said liquid foaming agent attached to said edge; and wherein when said at least one foaming die element is transferred to and stopped at said predetermined point by operation of said transfer mechanism, said injection molding unit is operated to move both of said injection mechanism and said injection gun downwardly towards said at least one foaming die element, with said pressure element being simultaneously moved toward and pressing said another end portion of said plate member against the biasing force of said biasing element to cause disengagement of said lid member from said another opened end portion of said injection nozzle, thereby opening and exposing said another opened end portion, and then said injection gun is engaged in the thus-exposed another opened end portion of said injection nozzle to thereby allow said liquid foaming agent to be injected through said injection gun and said injection nozzle into the inside of the three-dimensional trim cover assembly placed in said at least one foaming die element, and wherein after the liquid foaming agent has been injected in the three-dimensional trim cover assembly, said injection molding unit is reversely operated to move said injection mechanism and said injection gun upwardly from said at least one foaming die element, with said pressure element being moved away from said another opened end portion of said plate member, so that said lid member is biasingly caused by said biasing element to engage and fit in said another opened end portion of said injection nozzle, after which, said drive means of said injection gun cleaning mechanism is operated to cause said operative hollow body of said injection gun cleaning mechanism to move to said injection mechanism, so that said cleaning brush is brought into contact with an edge of said injection gun and rotated to clean off any residual portion of said liquid foaming agent attached to said edge.

3. The device as claimed in claim 2,
wherein said operative hollow body includes at least two different sloped wall regions defined in a side thereof facing toward said injection mechanism and said injection gun, and
wherein said pressure element comprises: a stationary pressure element fixed to said injection mechanism; and a movable pressure element pivotally connected with said stationary pressure element at a pivotal point, said movable pressure element having at least one roller rotatably provided therewith,
with such an arrangement that, when said operative hollow body is moved toward said injection mechanism, said at least one roller is contacted with and rotated on said at least two different sloped wall regions of said operative hollow body as well as said cleaning brush, while simultaneously said movable pressure element is thereby pivotally moved about said pivotal point and inclined relative to said stationary pressure element so as to ride over said operative hollow body, thereby preventing both said upper and movable pressure elements from interference with said operative hollow body in motion.

* * * * *